United States Patent [19]

Gehrt

[11] Patent Number: 4,661,732
[45] Date of Patent: Apr. 28, 1987

[54] SAFETY DEVICE FOR A CENTRIFUGAL ACTUATOR ASSEMBLY

[75] Inventor: Louis M. Gehrt, Desoto, Mo.

[73] Assignee: Emerson Electric Co., St. Louis, Mo.

[21] Appl. No.: 834,580

[22] Filed: Feb. 28, 1986

[51] Int. Cl.⁴ .................. H02K 11/00; H01H 35/10; H02P 5/30

[52] U.S. Cl. ................. 310/68 E; 200/80 R; 318/793

[58] Field of Search .......... 200/80 R; 310/68 E, 310/68 R; 318/793

[56] References Cited

U.S. PATENT DOCUMENTS

| | | | |
|---|---|---|---|
| 2,277,425 | 3/1942 | Wiest | 200/80 R |
| 2,747,854 | 5/1956 | Schnepf | 200/80 R |
| 3,271,602 | 9/1966 | Waters | 310/68 R |
| 3,609,421 | 9/1971 | Hildebrandt | 310/68 E |
| 3,691,415 | 9/1972 | Hancock et al. | 310/68 E |
| 3,790,730 | 2/1974 | Wyland | 310/68 E |
| 4,208,559 | 6/1980 | Gray | 200/80 R |
| 4,284,864 | 8/1981 | Crow et al. | 200/80 R |
| 4,296,366 | 10/1981 | Hildebrandt et al. | 318/793 |

Primary Examiner—Patrick R. Salce
Assistant Examiner—D. L. Rebsch
Attorney, Agent, or Firm—Polster, Polster and Lucchesi

[57] ABSTRACT

A centrifugal actuator assembly adapted to be mounted on a rotatable shaft, the assembly including actuating levers responsive to the rotational speed of the shaft, guide means to guide the levers in a predetermined inward and outward path during their movement between first and second positions and safety structure cooperative with the levers in the event of lever departure from such predetermined path to prevent further outward movement of the levers.

6 Claims, 8 Drawing Figures 4,661,732

1

SAFETY DEVICE FOR A CENTRIFUGAL ACTUATOR ASSEMBLY

BACKGROUND OF THE INVENTION

This invention relates to a centrifugal actuator assembly and more particularly to a centrifugal actuator assembly for actuating a starting switch for energization and deenergization of the starting winding of an electric motor and a safety structure therefor.

It is known in the electric motor art to actuate a switch for selective energization of stator windings used to generate suitable forces for rotating the rotor assembly in both "start" and "run" conditions. The switch conventionally is operated by a centrifugal actuator assembly mounted on and rotatable with the rotor shaft of the motor, the inwardly-outwardly moving levers of the centrifugal actuator assembly being responsive to the speed of the rotor shaft upon which the centrifugal actuator is mounted.

Various types of centrifugal actuators are known in the electric motor art which include centrifugal levers pivotally mounted in an assembly which in turn is mounted on the rotor shaft. The levers carry a weight on their outer or free ends, with the weights being thrown outwardly by centrifugal force effecting axial shifting movement of a portion of the centrifugal actuator with respect to the rotor shaft. This axial shifting movement is linked to a switch leading to motor windings which effect "start" and "run" conditions of the motor. It also is well known in the electric motor art to resiliently bias the centrifugal levers inwardly with extension springs. Several of these various arrangements are exemplified in such U.S. Pat. Nos. as: 2,372,064, issued to R. W. Esarey on Mar. 20, 1945; 2,747,854, issued to W. C. Schnepf on May 29, 1956; 3,609,421, issued to E. F. Hildebrandt; 3,271,602 issued to J. L. Waters on Sept. 6, 1966; 3,790,730, issued to A. D. Wyland on Feb. 5, 1974; and, 4,242,607, issued to E. F. Hildebrandt, et al on Dec. 30, 1980. The arrangements in these patents, as well as in other arrangements of the prior art, have been directed to centrifugal actuator structures and their respective functions during normal operations. Although certain of these arrangements have utilized stops and recessions or notches in carrying out the normal function of the centrifugal actuator structures, none has recognized the importance of specifically accommodating for improper operation of the several parts of a centrifugal actuator.

In accordance with the present invention, a simple, straightforward and inexpensive safety structure is provided for centrifugal actuator assemblies to prevent the same from literally flying apart during operations, resulting in undesirable hazards to both property and persons. The safety structure of the present invention is comparatively simple and straightforward in manufacture and operation and does not in any way interfere with the centrifugal actuator assembly during normal operations.

Various other features of the present invention will become obvious to one skilled in the art upon reading the disclosure set forth herein.

SUMMARY OF THE INVENTION

More particularly, the present invention provides a centrifugal actuator assembly adapted to be mounted on a rotatable shaft comprising: a pair of actuating levers disposed on opposite sides of the longitudinal axis of the shaft responsive to the rotational speed of the actuator assembly on the shaft for actuating movement of the levers between first and second positions upon acceleration and deceleration of the actuator assembly; means for biasing the levers toward the first position; guide means cooperating with the pair of actuating levers to guide them in a preselected guided path as they move between the first and second positions during normal operations of acceleration and deceleration; and, means to interrupt and prevent further outward movement of the levers in the event of improper actuator assembly and concomitant departure of the levers from the preselected guided path.

It is to be understood that various changes can be made by one skilled in the art in the arrangement, form and construction of the apparatus disclosed herein. For example, a different ramp and stop arrangement could be employed to interrupt and arrest outward movement of the actuating levers when they depart from their normal guide path of movement. Further, other guide arrangements, including a modification of the slider or even elimination of one as shown can be utilized.

BRIEF DESCRIPTION OF THE DRAWINGS

Referring to the drawings which disclose one advantageous embodiment of the present invention.

DESCRIPTION OF THE PREFERRED EMBODIMENT

Figure 1:
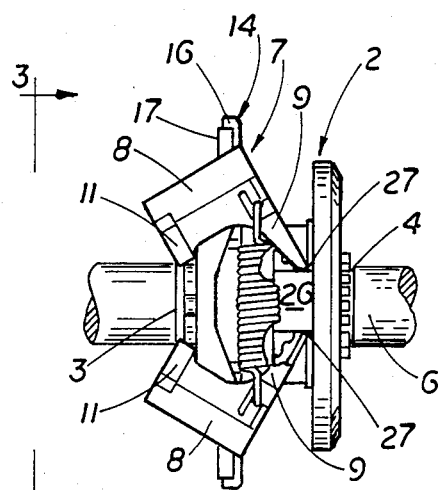
FIG. 1 is a side elevational view of the inventive actuator assembly mounted on a rotor shaft for rotation therewith, the actuating levers being shown in a spring biased inward or first position.

Referring to FIGS. 1-6 of the drawings, the inventive centrifugal actuator assembly 2 is shown as fixedly mounted between fixed stop collar 3 and groove 4 in the rotor shaft 6 of an electric motor (not shown) for rotation with shaft 6. It is to be understood that actuator assembly 2 can be linked to a suitable starting switch (also not shown) for energizing and deenergizing the starting windings of the electric motor.

Actuator assembly 2 includes a pair of similar actuating levers 7 positioned in mirror-image relation about rotor shaft 6. Each actuating lever 7 is of substantially L-shaped cross-section to include two leg portions, namely, outwardly moveable or free leg portion 8 and pivotal or inner leg portion 9. A weighted element 11 is integral with and projects normal from the outer edge of free leg portion 8 and each leg portion is appropriately recessed along the center of their respective free ends for shaft clearance purposes.

A suitable guide means for actuating levers 7 in the form of a sleeve 12 fixedly mounted to rotor shaft 6 between stop collar 3 and groove 4 includes a split end 13 with the extremities adapted to fit into groove 4 and a pair of lever guiding track members 14 extending in opposed cantilevered relationship from the opposite end thereof so as to be substantially normal to the longitudinal, rotating axis of rotor shaft 6. Each track member 14 has a stop ledge or lip portion 16 at its extremity which extends normal therefrom and is further provided with a longitudinally extending guide rib 17. These track members 14 are of preselected length, size and shape to extend through an aperture 18 disposed in levers 7 along the joined leg portions 8, 9. These apertures 18 conform with the cross-sectional contour of track members 14 to permit passage of these track members 14 therethrough when the leg portions 8, 9 are disposed at an angle to the longitudinal axis of the shaft with pivotal or inner leg portions 9 in their normal, biased pivot position, as will be described more fully hereinafter.

To bias the actuating levers 7 so that pivotal leg portions 9 are maintained in pivot position, a pair of coil springs 19 are disposed in spaced relation on opposite sides of shaft 6. The ends of these coil springs are connected to hooks 21 extending from leg portions 9.

To enhance the pivotal movement of actuating levers 7, a slider 22 is moveably keyed to sleeve 12 for longitudinal slidable movement thereon and thus movement axially of rotor shaft 6. Slider 22 has an annular ring 23 at one end thereof extending normal to shaft 2 with shoulder means in the form of a collar 24 having a pair of opposed side flanks 26 extending normally from annular ring 23. These side flanks 26 serve to provide pivot corners 27 for the free edges of pivotal or inner leg portions 9.

Figure 2:
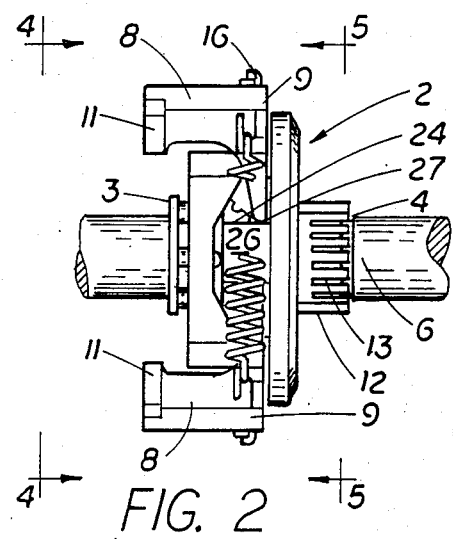
FIG. 2 is a side elevational view of the apparatus of FIG. 1, the actuating levers being shown in a centrifugally moved outward or second position.
Figure 3:
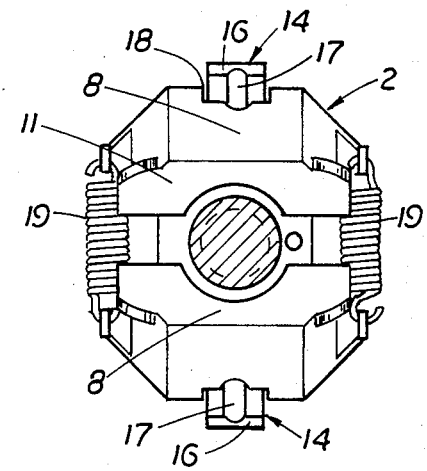
FIG. 3 is an end view of the apparatus as shown in FIG. 1, taken in a plane through line 3—3 in the direction of the arrows as shown in FIG. 1.
Figure 4:
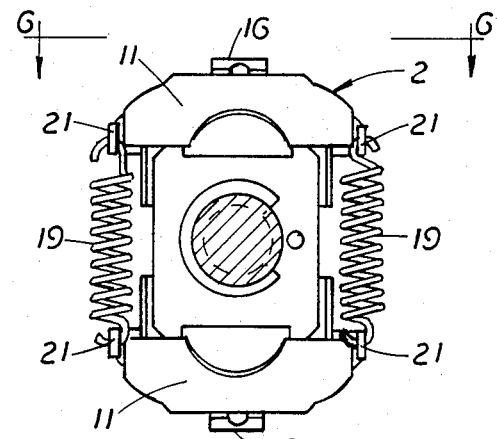
FIG. 4 is an end view of the apparatus as shown in FIG. 2 taken in a plane through line 4—4 in the direction of the arrows as shown with this line.
Figure 5:
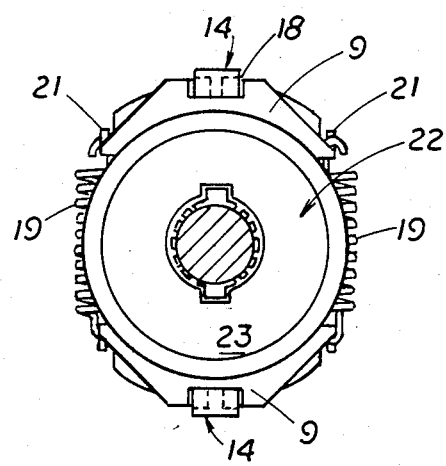
FIG. 5 is an opposite end view of the apparatus as shown in FIG. 2 taken in a plane through line 5—5 in the direction of the arrows as shown with this line.
Figure 6:
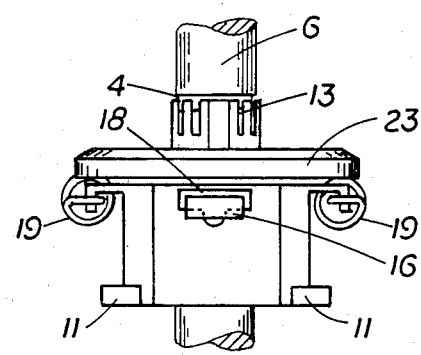
FIG. 6 is a top view of the apparatus as shown in FIG. 4 taken in a plane through line 6—6 in the direction of the arrows as shown with this line.
Figure 7:
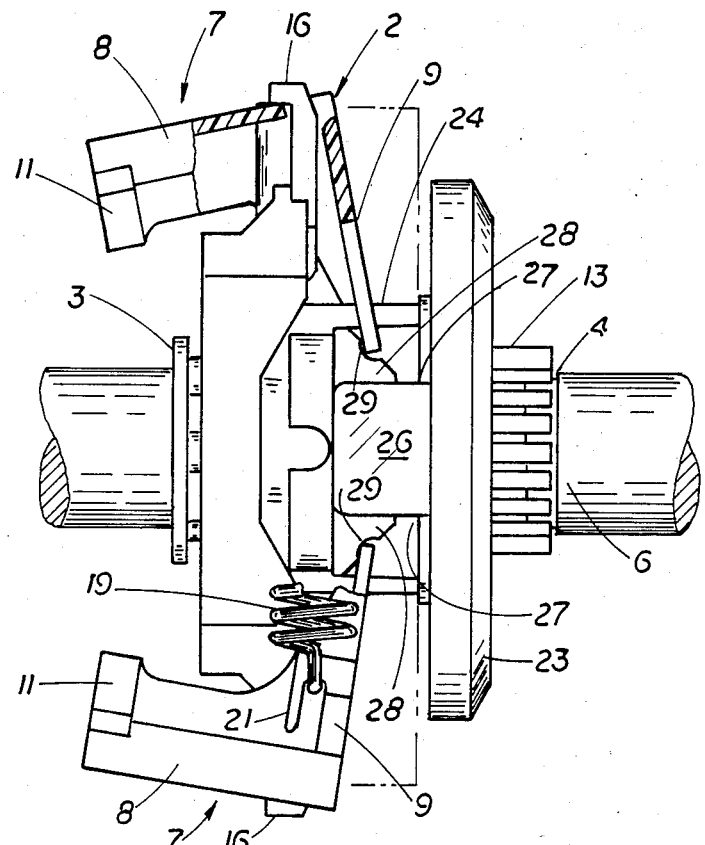
FIG. 7 is an enlarged partially broken away side elevational view of the inventive actuator assembly, showing details of the actuating levers nesting between stops and ramp indentations when the levers depart from normal pivot nesting corners; and, FIG. 8 is an exploded, perspective view of the several parts of the inventive centrifugal actuator assembly.
Figure 8:
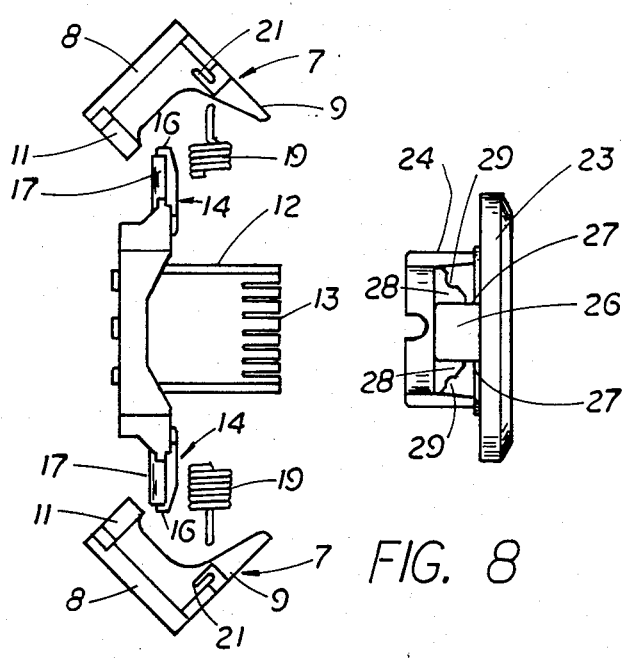

As can be seen in FIGS. 1 and 2 and more particularly in FIGS. 7 and 8, each of side flanks 26 on collar 24 of slider 22 is provided with camming means in the form of a pair of opposed inclined ramps 28 and each ramp 28 is, in turn, provided with an indentation 29. These ramp indentations 29 are so positioned or disposed relative aforedescribed stop ledges 16 on cantilevered track members 14 as to assure dropoff into indentations 29 of the pivot ends of leg portions 9 in the event of improper actuator operation and concomitant departure to ramps 28 of the pivot ends of spring biased leg portions 9 from their normal pivot corners 27, the leg portions 9 being oriented to snugly engage between the indentations 29 and the stop ledges 16 to thus interrupt and prevent further outward movement of the actuator levers 7.

During normal actuator operation, the inner tips of levers 7 pivot about the pivot corners 27, permitting corresponding operation of any associated switch. Prior to my invention, the free leg portions 8 of the lever 7 sometimes would continue the outward extension, beyond that shown in FIG. 2 of the drawings. In some cases, it was found that the extension 8 could either override or catch on lip portion 16. Thereafter, when power was disengaged from the application in which the actuator is used, the actuator would not return to the position shown in FIG. 1, but would stay locked in the position shown in FIG. 2. The position shown in FIG. 2 generally corresponds to the start position for any associated switch with which the actuator finds application. If the actuator remained in the position shown in FIG. 2, upon the re-energization of a motor, for example, the start winding of the motor would not be energized and the motor will not start. With the present invention, however, should the levers 7 have any tendency to continue outward movement, the inner tips of the levers 7 enter the indentations 29, causing a camming or rotation of the levers 7 so as to rotate the free ends of the levers 7 to engage the stop ledges 16, thereby preventing the disassembly of the actuator. The actuator then operates normally on the next start cycle. It has been found that motor failure due to automatic mis-operation has been substantially eliminated through the use of this invention.

Thus, by virtue of this straightforward, economical and efficient indented ramp camming arrangement aforedescribed, an additional safety device can be provided to accommodate improper or mis-operation of the actuator levers.

The invention claimed is:

1. A centrifugal actuator assembly adapted to be mounted on a rotatable shaft, comprising:

a pair of actuating levers disposed on opposite sides of the longitudinal axis of said shaft responsive to the rotational speed of said actuator assembly on said shaft for actuating movement of said levers between first and second positions upon acceleration and deceleration of said actuator assembly;

means for biasing said levers toward said first position;

guide means cooperating with said pair of levers to guide them in a preselected guided path as they move between said first and said second positions during normal operations of acceleration and deceleration, said guide means including a stop ledge for engaging at least one of said levers; and means to interrupt and prevent further outward movement of said levers in the event of improper actuator operation, said interrupt means including lever camming surfaces cooperatively positioned with said stop ledge so as to engage said levers to ensure alignment and snug nesting of said levers with said stop ledge in the event of improper actuator operation.

2. A centrifugal actuator assembly adapted to be mounted on a rotatable shaft, comprising:

a pair of actuating levers disposed on opposite sides of the longitudinal axis of said shaft responsive to the rotational speed of said actuator assembly on said shaft for actuating movement of said levers between first and second positions upon acceleration and deceleration of said actuator assembly;

means for biasing said levers toward said first position;

guide means cooperating with said pair of levers to guide them in a preselected guided path as they move between said first and said second positions during normal operations of acceleration and deceleration; and means to interrupt and prevent further outward movement of said levers in the event of improper actuator operation and concomitant departure of said lever from said preselected guide path, including lever camming surfaces and space stops cooperatively positioned relative each other to assure alignment and snug nesting of said levers between said stops and said camming surfaces in the event of improper actuator operation and concomitant departure of said levers from said preselected guide path.

3. In an electric motor having a starting winding, a starting switch for energizing and deenergizing the starting winding, a rotor shaft, and a centrifugal actuator for actuation of said starting switch, said centrifugal actuator being rotatable with said rotor shaft, said centrifugal actuator comprising:

a pair of actuating levers of mirror-image substantially L-shaped cross-section, the leg portions of which are centrally recessed adjacent their free edge portions with each lever having an aperture disposed therein along the joined leg portions;

guide means including a sleeve fixedly mounted to said rotor shaft for rotation therewith, said sleeve having lever guiding track members extending in opposed cantilevered relationship from one end thereof so as to be substantially normal to the longitudinal axis of said shaft, each of said track members having a stop ledge projecting substantially normally therefrom at the cantilevered extremity thereof, said track members each being of preselected length, size and shape relative said corresponding aperture in said actuating lever, to pass therethrough when the leg portions of said actuating lever are disposed at an angle to the longitudinal axis of said shaft; a pair of coil springs disposed in spaced relation on the opposite sides of said shaft with the ends thereof connecting opposed leg portions of said mirror-image actuating levers to bias said actuating levers to an angled first position;

a slider mounted in keyed, slidable relation on said sleeve of said guide means for movement axially of said shaft, said slider having a normally extending annular collar at one end thereof and shoulder means extending normally from said collar to provide nesting corners for the spring biased mirror-image leg portions of said actuating levers during normal pivotal actuating movement thereof with the other leg portion of each lever being centrifugally moved outwardly by the accelerating speed of said rotor shaft; and, camming means including inclined ramps mounted on said shoulder means adjacent said nesting corners; said ramps having indentations therein, said indentations being disposed relative said stop ledge projections at the extremities of said cantilevered track members to assure drop-off of said biased leg portions of said actuating levers and snug nesting alignment of said actuating levers between said stop ledge projections and said indentations in the event of improper actuator operation and concomitant departure of the leg portion of each actuating lever from its nesting corner about which said leg portion normally pivots in its preselected guide path.

4. A centrifugal actuator assembly adapted to be mounted on a rotatable shaft, comprising:

a pair of actuating levers disposed on opposite sides of the longitudinal axis of said shaft responsive to the rotational speed of said actuator assembly on said shaft for actuating movement of said levers between first and second positions upon acceleration and deceleration of said actuator assembly;

means for biasing said levers toward said first position;

guide means cooperating with said pair of levers to guide them in a preselected guided path as they move between said first and said second positions during normal operations of acceleration and deceleration, said guide means including a slider mounted for movement axially of said shaft, said slider having nesting corners about which one set of mirror-image ends of said pair of actuating levers pivot during normal pivotal actuating movement thereof; camming means cooperatively positioned adjacent said nesting corners, said camming means including inclined ramp surfaces having indentations therein to receive said pivot ends of said actuating levers in the event of misalignment; stops spacedly mounted on said guide means and cooperatively positioned relative said indentations on said ramp surfaces to assure alignment and snug nesting of said levers between said stops and said indentations in the event of improper actuator operation and concomitant departure of said actuating levers from said nesting corners about which said levers normally pivot in their preselected pivotal path.

5. A centrifugal actuator assembly adapted to be mounted on a rotatable shaft, comprising:

a pair of actuating levers disposed on opposite sides of the longitudinal axis of said shaft responsive to the rotational speed of said actuator assembly on said shaft for actuating movement of said levers between first and second positions upon acceleration and deceleration of said actuator assembly;

means for biasing said levers toward said first position;

guide means cooperating with said pair of levers to guide them in a preselected guided path as they move between said first and said second positions during normal operations of acceleration and deceleration, said guide means including a sleeve fixedly mounted to said shaft for rotation therewith, said sleeve having lever guiding tracking members extending in opposed cantilevered relationship therefrom substantially normal to the longitudinal axis of said shaft, said track members having opposed lever stop means at the extremities thereof; a slider mounted on said sleeve for relative movement thereto and axially to said shaft; said slider having an annular collar and shoulder means extending normally therefrom to provide nesting corners about which one set of mirror-image ends of said pair of actuating levers pivot during normal pivotal actuating movement thereof; and camming means positioned cooperatively adjacent said shoulder means, said camming means including inclined ramps having indentations therein, positioned relative said stop means on said lever guiding track means to assure alignment and snug nesting of said levers between said stop means and said indentations in the event of improper actuator operation and concomitant 'department of said actuating levers from said nesting corners about which said levers normally pivot in their preselected guide path.

6. The apparatus of claim 5, said pair of actuating levers being of mirror-image L-shaped cross-section and having apertures disposed therein through which said normally disposed track members extend, said apertures being sized and shaped relative said track members to permit pivotal guiding movement of said actuating levers relative said track members.

* * * * *